(12) United States Patent
Stone

(10) Patent No.: US 6,481,078 B1
(45) Date of Patent: Nov. 19, 2002

(54) FIXTURE FOR SUNROOF ASSEMBLY

(75) Inventor: Charles L Stone, Metamora, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 119 days.

(21) Appl. No.: 09/671,403

(22) Filed: Sep. 27, 2000

(51) Int. Cl.[7] .............................................. B23P 19/00
(52) U.S. Cl. ........................ 29/281.5; 29/281.6; 29/252
(58) Field of Search .......................... 269/55, 58, 71, 269/21, 46; 29/281.5, 281.4, 281.6, 252

(56) References Cited

U.S. PATENT DOCUMENTS

| 5,722,148 A | 3/1998 | Uemoto et al. ............... 29/468 |
| 5,778,517 A | 7/1998 | Amesbichler et al. ........ 29/709 |
| 6,035,510 A | 3/2000 | Amesbichler et al. ........ 29/434 |
| 6,237,216 B1 * | 5/2001 | Jin ............................. 29/800 |

* cited by examiner

Primary Examiner—Robert C. Watson
(74) Attorney, Agent, or Firm—Mark P. Calcaterra

(57) ABSTRACT

A fixture for automatically positioning a sunroof glass within a sunroof frame, mounted in an automotive vehicle, is provided. The fixture includes an outer assembly configured to attach to the vehicle roof. The fixture further includes an inner assembly having first and second net blocks connected thereon. The first and second net blocks define the desired installation position of the sunroof glass with respect to the vehicle roof. The inner assembly is configured to attach to the vehicle roof. The inner assembly is further configured to attach to the sunroof glass and to move the glass against the first and second net blocks. The inner assembly is disposed substantially within the outer assembly and is pivotally connected at a first pivot point to the outer assembly. Finally, the fixture includes a first movement actuator disposed between the outer assembly and inner assembly for selectively rotating the inner assembly about the first pivot point relative to the outer assembly.

9 Claims, 3 Drawing Sheets

FIXTURE FOR SUNROOF ASSEMBLY

FIELD OF THE INVENTION

This invention relates to a fixture, and in particular, to a fixture for positioning a sunroof glass in a sunroof frame mounted in an automotive vehicle.

BACKGROUND OF THE INVENTION

Sunroof assemblies have long been used in automotive vehicles. A sunroof assembly generally comprises a sunroof frame and a sunroof glass held within the frame. During installation of the sunroof assembly, the sunroof frame is mounted to the roof of the vehicle. Further, the sunroof glass is finely positioned and secured with respect to the roof the vehicle. In particular, the sunroof glass is positioned in the sunroof frame so that air flowing over the roof of the vehicle will be deflected by the glass away from the vehicle. As a result, the amount of air that may leak into the passenger compartment is decreased and the noise associated with any air leaks is decreased.

To accomplish the air deflection, the front end of the sunroof glass (proximate the front portion of the roof) is preferably flush or slightly lower (i.e., −1.0 mm) than the roof sheet metal. Further, the rear edge of the sunroof glass (proximate the rear of the roof) is preferably flush to slightly higher (i.e., +1.0 mm) than the roof sheet metal.

Known manufacturing methods to position the sunroof glass within the sunroof frame are time consuming and labor intensive. Generally, assembly line workers manually position the sunroof glass within the sunroof frame relative to the vehicle roof. Workers further measure the distance from sheet metal of the vehicle roof to the sunroof glass to verify the glass is at a desired position—before securing the glass in the frame. Thus, significant manufacturing time is used to position the sunroof glass in the sunroof frame. Further, assembly line workers may not consistently position the sunroof glass to the desired position using the known manufacturing methods.

There is thus a need for a fixture for positioning the sunroof glass within a sunroof frame to minimize or reduce one or more of the above-mentioned deficiencies.

SUMMARY OF THE INVENTION

The present invention provides a fixture for positioning a sunroof glass within a sunroof frame mounted in an automotive vehicle and a method related thereto. The fixture for positioning the sunroof glass in accordance with the present invention includes an outer assembly configured to attach to the vehicle roof. The fixture further includes an inner assembly having first and second net blocks connected thereon. The net blocks define the desired installation position of the sunroof glass with respect to the vehicle roof. The inner assembly is configured to attach to the vehicle roof. The inner assembly is further configured to attach to the sunroof glass to move the glass against the first and second net blocks. The inner assembly is disposed substantially within the outer assembly and is pivotally connected at a first pivot point to the outer assembly. Finally, the fixture includes a first movement actuator disposed between the outer assembly and inner assembly for selectively rotating the inner assembly about the first pivot point relative to the outer assembly.

A method for positioning a sunroof glass within a sunroof frame mounted in a vehicle in accordance with the present invention is provided. The inventive method includes a step of providing an outer assembly configured to attach to the vehicle roof. The method further includes a step of providing an inner assembly having an inner frame with first and second net blocks connected thereon. The inner assembly is configured to fixedly attach to said vehicle roof and to said sunroof glass. The inner assembly is further configured to move the glass with respect to the inner frame. Further, the inner assembly is rotatably connected at a first pivot point to the outer assembly. The method further includes a step of attaching the outer assembly to the vehicle roof. The method further includes a step of attaching the inner assembly to the vehicle roof. The method still further includes a step of attaching the inner assembly to the sunroof glass. Finally, the method includes a step of moving the glass upwardly against the first and second net blocks.

The fixture for positioning the sunroof glass within the sunroof frame and the method related thereto represent a substantial improvement over conventional fixtures and methods. In particular, the inventive fixture allows for the automatic positioning of the sunroof glass with respect to the vehicle roof. Further, the fixture allows for consistent positioning of the sunroof glass with respect to the vehicle roof. As a result, the inventive fixture allows for fewer manual steps on an assembly line to position the sunroof glass. Thus, the inventive fixture reduces manufacturing costs for automotive vehicles, having sunroof assemblies.

These and other features and advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
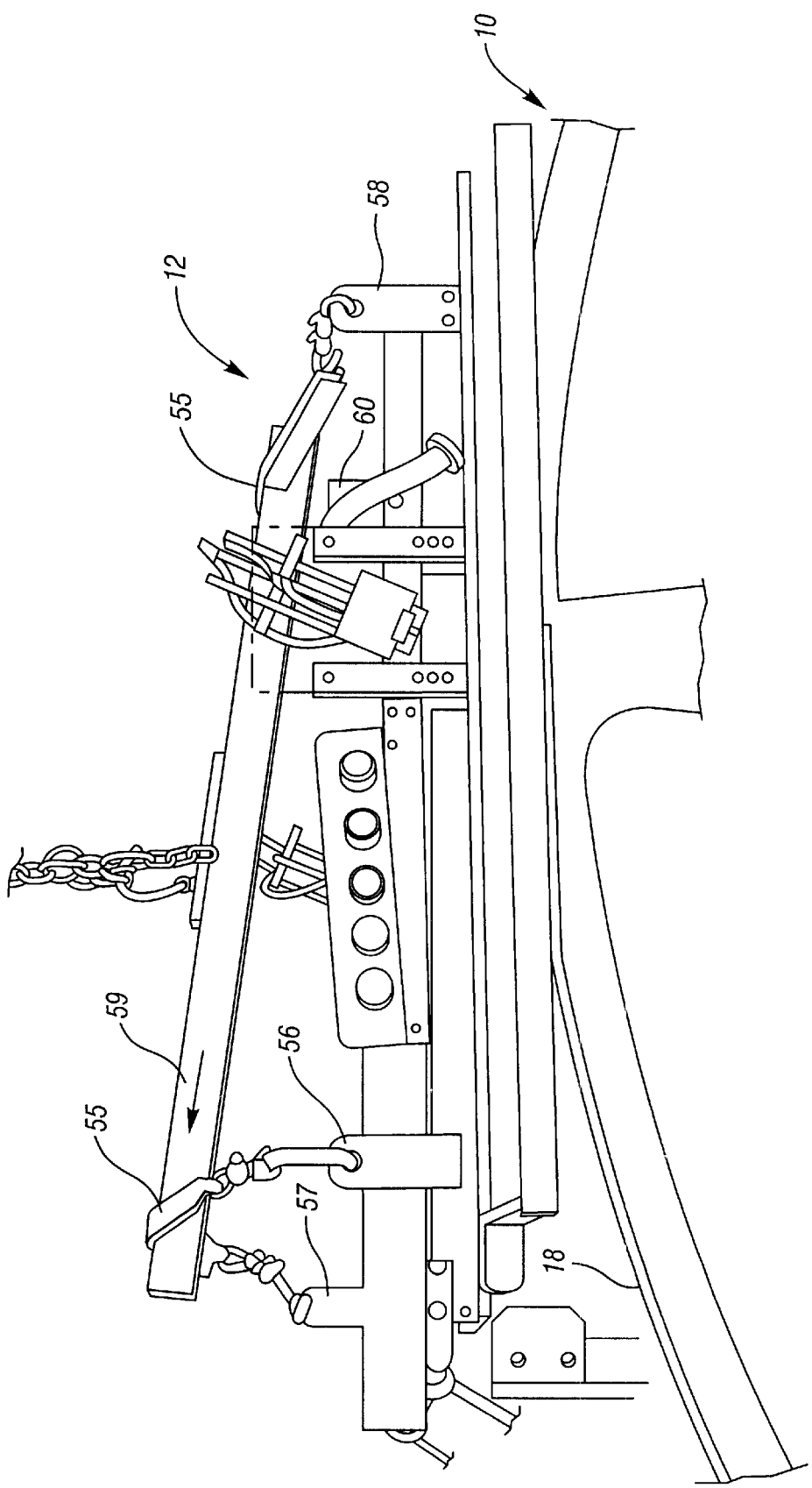
FIG. 1 is a schematic showing a vehicle roof and a fixture in an operational position in accordance with the present invention.
Figure 5:
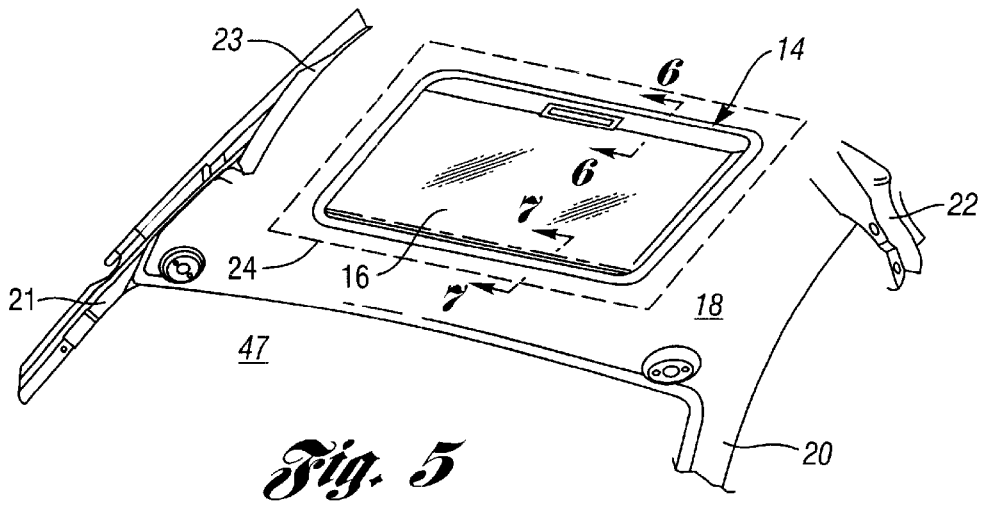
FIG. 5 is a fragmentary view of a vehicle roof having a sunroof assembly.

Referring now to the drawings wherein like reference numerals are used to identify identical components in the various views, FIG. 1 illustrates an automotive vehicle generally indicated by the numeral 10 and a fixture 12 in accordance with the present invention. Referring to FIG. 5, the fixture 12 is utilized to position a sunroof glass 16 in a sunroof frame 24 relative to the vehicle roof 18.

The vehicle 10 includes the roof 18 supported by A-pillars 20, 21 and B-pillars 22, 23. The vehicle 10 further includes the sunroof assembly 14 comprising the sunroof frame 24 and the sunroof glass 16. The sunroof frame 24 is attached to the vehicle roof 18 utilizing screws (not shown). The sunroof glass 16 is also secured in the sunroof frame 24 utilizing screws (now shown).

Figure 6:
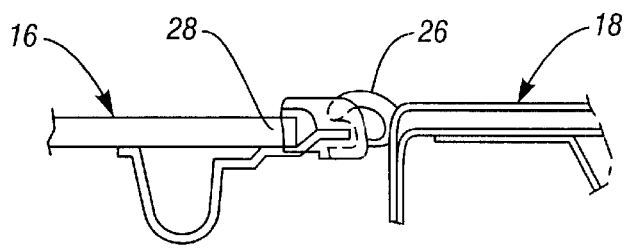
FIG. 6 is a sectional view of the sunroof assembly and the vehicle roof taken along lines 6—6 of FIG. 5.
Figure 7:
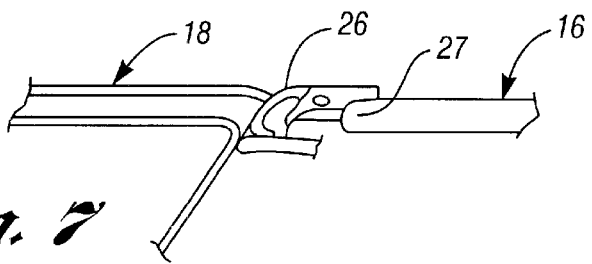
FIG. 7 is a sectional view of a sunroof assembly and a vehicle roof taken along lines 7—7 of FIG. 5.

Referring to FIG. 7, the sunroof glass 16 is sealed against the vehicle roof 18 utilizing a seal 26. As previously discussed, the front end 27 of the glass 16 is preferably positioned flush or slightly lower (i.e., −1.0 mm) than the sheet metal of the roof 18. Further, referring to FIG. 6, the rear end 28 of the glass 16 is preferably positioned flush or slightly higher (i.e., +1.0 mm) than the sheet metal of the roof 18. Thus, the foregoing positioning of the glass 16 directs airflow away from the occupant compartment of the vehicle 10. This redirection of airflow reduces any air leaks and associated noise in the occupant compartment of the vehicle 10.

Figure 2:
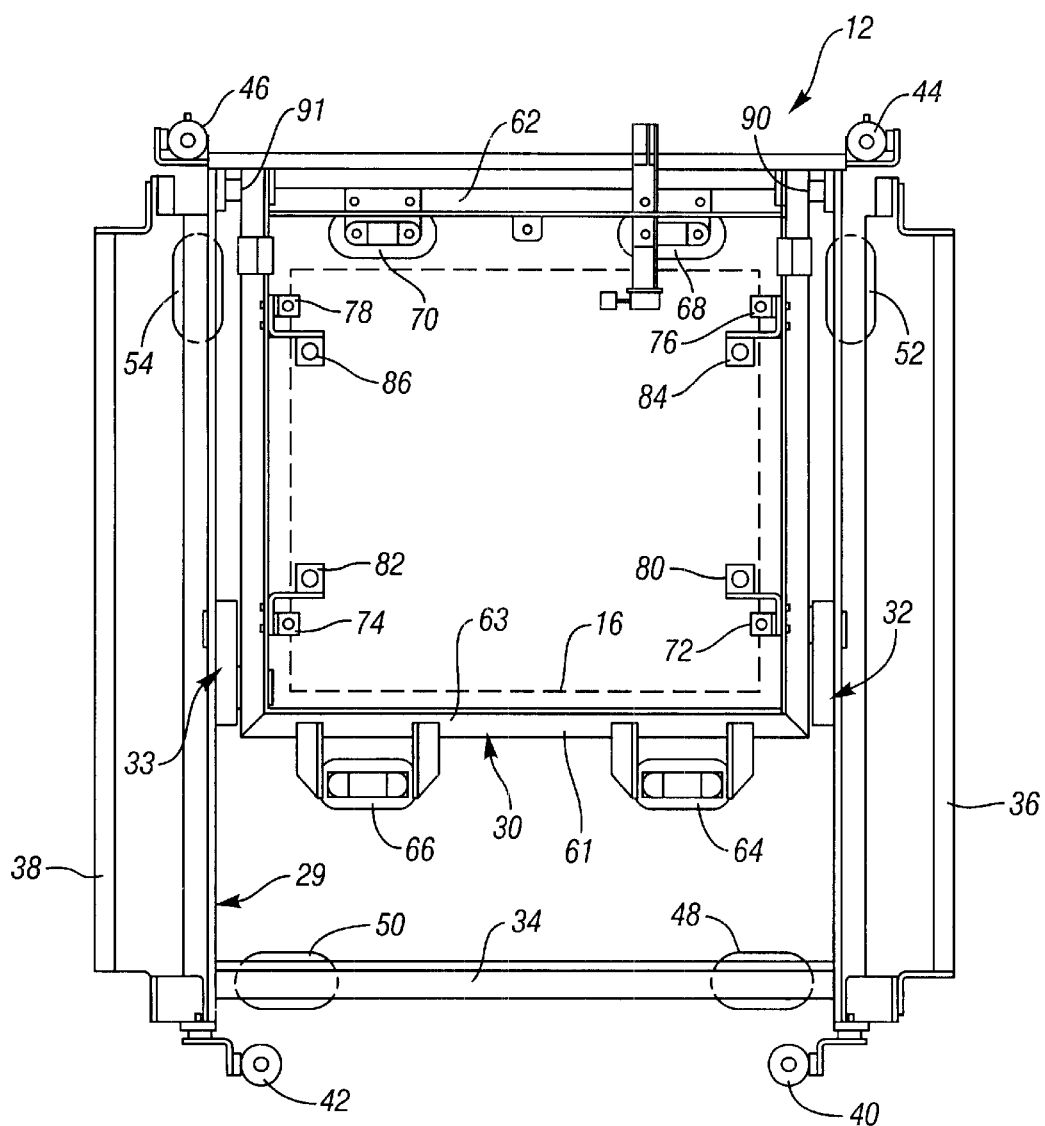
FIG. 2 is a top view of a fixture in accordance with the present invention.

Referring to FIG. 2, the fixture 12 is provided to automatically position the sunroof glass 16 within the sunroof frame 24 mounted in the vehicle 10. During the positioning of the glass 16, the glass 16 is not securely fastened in the sunroof frame 24 and thus "floats" until the glass 16 is secured in a predetermined position by tightening securing screws (not shown). The fixture 12 includes an outer assembly 29, an inner assembly 30, and movement actuators 32 and 33.

The outer assembly 29 is provided to support and operatively position the inner assembly 30. Referring to FIGS. 1 and 2, the outer assembly 29 includes an outer frame 34, hand guides 36, 38, positioning guides 40, 42, 44, 46, suction devices 48, 50, 52, 54, and attachment brackets 56, 57, 58, and 60.

Referring to FIG. 1, the outer frame 34 is provided to support the inner frame 61 of the fixture 12. The outer frame 34 has a rectangular perimeter and may be constructed from a plurality of materials including metals and plastics.

Figure 3:
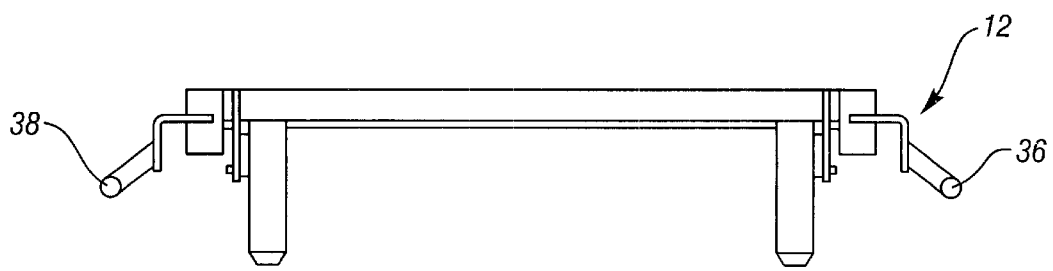
FIG. 3 is a front view of the fixture shown in FIG. 2.

Referring to FIGS. 2 and 3, the hand guides 36, 38 are provided to allow an assembly line worker to position the fixture 12 on the roof 18 of an automotive vehicle 10. The hand guides 36, 38 are disposed on opposite sides of the fixture 12 corresponding to the driver and occupant sides of the vehicle 10.

Referring to FIGS. 2 and 5, positioning guides 40, 42, 44, 46 are also provided to assist an assembly line worker in positioning the fixture 12 to a desired operational position on the roof 18. In particular, positioning guides 40, 42 are configured to fit within a front window space 47 and to abut against the A-pillars 20, 21, respectively. Similarly, positioning guides 44, 46 are configured to fit within a rear window space (not shown) and to abut against the B-pillars 22, 23.

Referring to FIG. 2, the suction devices 48, 50, 52, 54 are provided to selectively allow the fixture 12 to be secured to the roof 18. The suction devices 48, 50, 52, 54 are conventional suction cups that are operatively connected to vacuum lines (not shown). The vacuum lines selectively apply a vacuum between the devices 48, 50, 52, 54 and the roof 18. When a vacuum is applied between suction devices 48, 50, 52, 54, and the roof 18, outer assembly 29 is secured against the roof 18. When the vacuum is removed between the suction devices 48, 50, 52, 54, and the roof 18, the outer assembly 29 may be readily moved relative to the roof 18.

Referring to FIG. 1, attachment brackets 56, 57, 58, 60 may be utilized to allow the fixture 12 to be easily moved along an assembly line (not shown). The brackets 56, 57, 58, 60 are attached to the outer frame 34 and each have an attachment hole through which harness ropes 55 are attached. As illustrated, the harness ropes 55 may be wrapped around a lift bar 59 which is connected to a hoist (not shown) for lifting and moving the fixture 12.

Figure 4:
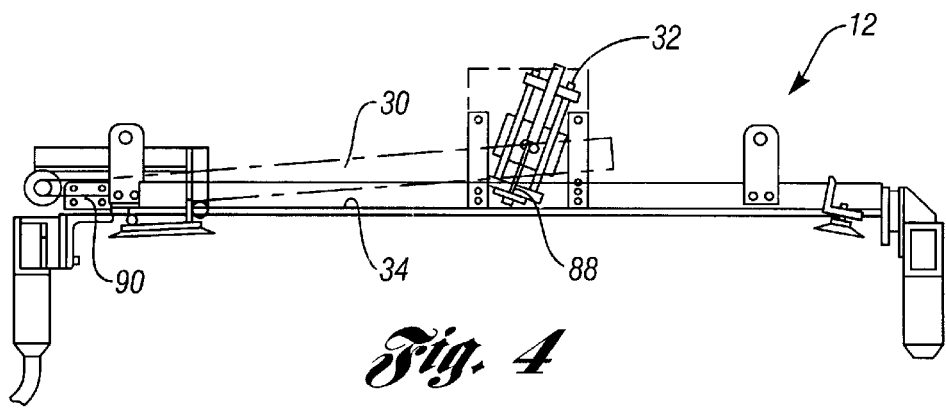
FIG. 4 is a side view of the fixture shown in FIG. 2.

Referring to FIG. 2, the inner assembly 30 is provided to attach to the sunroof glass 16 and to move the glass to a predetermined position relative to the roof 18. The inner assembly 30 includes an inner frame 61 having a first end 62 and a second end 63, suction devices 64, 66, 68, 70, net blocks 72, 74, 76, 78, and suction devices 80, 82, 84, 86. Referring to FIGS. 2 and 4, the inner assembly 30 may be selectively rotated about pivot points 90, 91 to either contact the roof 18 or to move outwardly from the roof 18.

The inner frame 61 is provided to support the remaining components of the inner assembly 30. The inner frame 61 has a rectangular perimeter and may be constructed from a plurality of materials including metals and plastics. As illustrated, the perimeter of the inner frame 61 is preferably larger than the perimeter of the sunroof glass 16. The inner frame 61 is rotatably connected to outer frame 34 at pivot points 90, 91 and is disposed substantially within the perimeter of the outer frame 34.

The suction devices 64, 66, 68, 70 are provided to allow the inner assembly 30 to be selectively secured to the vehicle roof 18. The suction devices 64, 66, 68 and 70 are conventional suction cups that are operatively connected to vacuum lines (not shown) as known by those skilled in the art.

The vacuum lines may selectively apply a vacuum between the devices 64, 66, 68, 70 and the vehicle roof 18. When a vacuum is applied between suction devices 64, 66, 68, 70 and the roof 18, inner assembly 30 is held against the roof 18. It should be understood that inner assembly 30 is secured against the roof 18 when the sunroof glass 16 is being set to a desired position relative to the roof 18. Alternately, when the vacuum is removed between the suction devices 64, 66, 68, 70 and the roof 18, the inner assembly 30 may be readily moved relative to the roof 18.

The net blocks 72, 74, 76, 78 define the desired position of the sunroof glass 16 relative to the vehicle roof 18. The net blocks 72, 74, 76, 78 are attached to the inner frame 61 so that they are disposed directly above the sunroof glass 16 when the fixture 12 is operatively disposed on the vehicle roof 18. Further, the net blocks 72, 74, 76, 78 are vertically adjustable. Referring to FIGS. 2, 6 and 7, the net blocks 72, 74 define the desired vertical position of the front end 27 of the sunroof glass 16 relative to the sheet metal of the vehicle roof 18. Similarly, the net blocks 76, 78 define the desired vertical position of the rear end 28 of the glass 16 relative to the sheet metal of the vehicle roof 18.

Referring to FIG. 2, the suction devices 80, 82, 84, 86 are provided to move the sunroof glass 16 against the net blocks 72, 74, 76, 78. The suction devices 80, 82, 84, 86 are conventional suction cups that are operatively connected to vacuum lines (not shown). The vacuum lines may selectively apply a vacuum between the devices 80, 82, 84, 86 and the sunroof glass 16. In addition, each of suction devices 80, 82, 84, 86 is connected to a shaft (not shown) of a pneumatic actuator (not shown) that may be selectively extended or retracted. It should be understood that when the inner assembly 30 is attached to the roof 18 and the assembly 30 is rotated to the closest operative position to the roof 18, a small gap may exist between the suction devices 80, 82, 84, 86 and the glass 16. Accordingly, the suction devices 80, 82, 84, 86 may be extended downwardly via the pneumatic actuators (not shown) to contact the glass 16. When a vacuum is applied between the suction devices 80, 82, 84, 86 and the glass 16, the inner assembly 30 is secured to the glass 16. Thereafter, the suction devices may be retracted upwardly using the pneumatic actuators (not shown) to move the glass 16 against the net blocks 72, 74, 76, 78.

Referring to FIG. 2, the movement actuators 32, 33 are disposed between the outer assembly 29 and the inner assembly 30 to selectively rotate the inner assembly 30 toward or away from the roof 18. The movement actuators 32, 33 may comprise air cylinders, each of which are disposed on opposing sides of the inner assembly 30. Referring to FIGS. 2 and 4, each of the movement actuators 32, 33 may be attached to the inner assembly 30 and have a shaft 88 that is attached to the outer frame 34. The shafts 88 may be extended or retracted via pneumatic lines (not shown). By extending the shafts 88, the inner assembly 30 will be rotated about pivot points 90, 91 outwardly from the roof 18. Alternately, retracting the shafts 88 will rotate the inner assembly 30 about pivot points 90, 91 toward the roof 18. After the sunroof frame 24 is initially mounted to the vehicle roof 18, the sunroof assembly 14 is moved to several operational positions in order to move the glass 16 above the seal 26 as will be explained in more detail below. Accordingly, before this initial movement of the glass 16, the inner assembly 30 needs to be rotated away from the roof 18 so the glass 16 will not hit the assembly 30. Afterward, the inner assembly 30 is rotated toward the roof 18 for positioning the glass 16 relative to the roof 18.

While a preferred embodiment of the present invention has been disclosed, it is to be understood that it has been described by way of example only and that various modifications can be made without departing from the spirit and scope of the invention as it is encompassed in the following claims.

I claim:

1. A fixture for positioning a sunroof glass within a sunroof frame, mounted in a vehicle, to a predetermined position with respect to a vehicle roof, comprising:

an outer assembly configured to attach to said vehicle roof;

an inner assembly having first and second net blocks connected thereon and adapted to abut said sunroof glass, said inner assembly being further configured to attach to said sunroof glass, said inner assembly being disposed substantially within said outer assembly and pivotally connected at a first pivot point to said outer assembly; and, a first movement actuator disposed between said outer assembly and said inner assembly for selectively rotating said inner assembly about said first pivot point relative to said outer assembly.

2. The fixture of claim 1 wherein said outer assembly includes an outer frame with first and second suction devices disposed thereon for attaching said outer assembly to said vehicle roof.

3. The fixture of claim 1 wherein said outer assembly includes an outer frame with first, second, and third positioning guides disposed thereon for positioning said outer assembly on said vehicle roof.

4. The fixture of claim 1 wherein said inner assembly includes an inner frame with first and second suction devices disposed thereon for attaching said inner assembly to said vehicle roof.

5. The fixture of claim 1 wherein said inner assembly includes an inner frame with first and second suction devices disposed thereon for attaching said inner assembly to said sunroof glass.

6. The fixture of claim 1 wherein said inner assembly further includes third and fourth net blocks connected thereon defining a desired position of said sunroof glass.

7. The fixture of claim 1 wherein said first movement actuator is an air cylinder.

8. The fixture of claim 1 further including a second movement actuator disposed between said outer assembly and said inner assembly for selectively rotating said inner assembly about said first pivot point relative to said outer assembly.

9. A fixture for positioning a sunroof glass within a sunroof frame, mounted in a vehicle, to a predetermined position with respect to a vehicle roof, comprising:

an outer assembly configured to attach to said vehicle roof, said outer assembly having an outer frame with first, second, and third positioning guides disposed thereon for positioning said outer assembly on said vehicle roof;

an inner assembly having first and second net blocks connected thereon defining a desired position of said sunroof glass, said inner assembly being configured to attach to said sunroof glass, said inner assembly being disposed substantially within said outer assembly and pivotally connected at a first pivot point to said outer assembly; and, an air cylinder disposed between said outer assembly and said inner assembly for selectively rotating said inner assembly about said first pivot point relative to said outer assembly.

* * * * *